(12) United States Patent
Buckley et al.

(10) Patent No.: US 8,122,043 B2
(45) Date of Patent: Feb. 21, 2012

(54) SYSTEM AND METHOD FOR USING AN EXEMPLAR DOCUMENT TO RETRIEVE RELEVANT DOCUMENTS FROM AN INVERTED INDEX OF A LARGE CORPUS

(75) Inventors: Brad Buckley, Ipswich, MA (US); Igor Motov, Ipswich, MA (US)

(73) Assignee: Ebsco Industries, Inc, Birmingham, AL (US)

( * ) Notice: Subject to any disclaimer, the term of this patent is extended or adjusted under 35 U.S.C. 154(b) by 315 days.

(21) Appl. No.: 12/494,452

(22) Filed: Jun. 30, 2009

(65) Prior Publication Data

US 2010/0332503 A1 Dec. 30, 2010

(51) Int. Cl.
*G06F 7/00* (2006.01)

(52) U.S. Cl. ........................................ 707/759; 707/754

(58) Field of Classification Search ........................ None
See application file for complete search history.

(56) References Cited

U.S. PATENT DOCUMENTS

| | | | | |
|---|---|---|---|---|
| 2006/0143175 | A1* | 6/2006 | Ukrainczyk et al. | 707/6 |
| 2008/0215574 | A1* | 9/2008 | Lin et al. | 707/5 |
| 2010/0332511 | A1* | 12/2010 | Stockton et al. | 707/759 |

OTHER PUBLICATIONS

Salton, G, et al.; Term Weighting Approaches in Automatic Text Retrieval; Department of Computer Science Cornell University; Nov. 1987.

Robertson, S.E., et al.; Okapi/Keenbow at TREC-8; Microsoft Research Ltd.

Brandberg, G.; Query Expansion Using Collaborative Filtering Algorithm; Information Technology Department of Information Technology, Uppsala University; Feb. 2001.

tf-idf; http://en.wikipedia.org/wiki/Tf-idf; Obtained Mar. 1, 2011.

Okapi-BM25; http://en.wikipedia.org/wiki/okapi_BM25; Obtained Mar. 1, 2011.

Witten, Ian H., Moffat, Alistair, and Bell, Timothy C., Managing Gigabytes: Compressing and Indexing Documents and Images, Morgan Kaufmann Series . . . , 1999, p. 180-188, U.S.

Robertson, S.E. et al.; Okapi/Keenbow at TREC-8; Microsoft Research Ltd., available at least as early as Nov. 11, 2008.

tf-idf; http://en.wikipedia.org/wiki/TF-idf; available at least as early as Nov. 11, 2008.

Okapi-BM25; http://en.wikipedia.org/wiki/okapi_BM25; available at least as early as Nov. 11, 2008.

* cited by examiner

*Primary Examiner* — Belix M Ortiz
(74) *Attorney, Agent, or Firm* — Smith, Gambrell & Russell

(57) ABSTRACT

A system and method for using an exemplar document or search query to retrieve relevant documents from an inverted index of a large corpus of documents. The system and method groups words by synonym and calculates term frequency (TF) and inverse document frequency (IDF) scores for the respective word groups. A composite term frequency-inverse document frequency (TF-IDF) score is calculated for each word group and the documents of the corpus are ranked based on the TF-IDF scores, utilizing a vector space model incorporating a cosine similarity function.

20 Claims, 3 Drawing Sheets

SYSTEM AND METHOD FOR USING AN EXEMPLAR DOCUMENT TO RETRIEVE RELEVANT DOCUMENTS FROM AN INVERTED INDEX OF A LARGE CORPUS

BACKGROUND OF THE INVENTION

Embodiments of a system and method for using an exemplar document or search query to retrieve relevant documents from an inverted index of a large corpus of documents are presented herein.

With the ever-increasing amount of data stored in electronic form, it is becoming increasingly important to effectively search through a large amount of data to find relevant data. With respect to text data, it is important to quickly and accurately search a large number of text documents (a "corpus") to find documents of relevance to the searcher.

Various methods are known that allow a searcher to enter search terms or utilize an exemplar document to search for other documents related to the given search terms or exemplar document. One such method in the prior art involves the ranking of individual search terms by a TF-IDF (Term Frequency-Inverse Document Frequency) score. In such a method, each search term in a query or exemplar document is assigned a TF-IDF score based on 1) the frequency of the term in the query (the "TF" component) and 2) the inverse frequency (rarity) of the term in the documents of the corpus (the "IDF" component).

In general, the TF component will be higher for a given term if the term appears a relatively large number of times in the search query. The reason for this is that a frequently occurring term in the search query is usually a term of high importance to the searcher. Conversely, the IDF component for a given term will be lower if the term appears in a relatively large number of documents in the corpus. The reason for this is that a term that is ubiquitous across documents is often a very common word that is of little value to the searcher. For instance, common English words such as the articles "the" or "an" will occur in nearly every document of English prose and thus will have a low IDF component. Since searchers are usually not concerned with the presence of such ubiquitous words, the low IDF component will minimize the effect of these words on the overall TF-IDF score for these common words.

After calculating an individual TF-IDF score for individual search terms in the query, the individual documents of the corpus are ranked to determine their likely relevance to the searcher. This is often performed using a vector space model along with cosine similarity to determine the similarity between the documents of the corpus and the search query/exemplar document.

SUMMARY OF THE INVENTION

Embodiments of the system and method described herein provide for improved accuracy of TF-IDF scoring and ranking systems. In embodiments, the effect of the TF component is dampened based on the number of unique words in the query. In the prior art, the TF component was often given a disproportionately large weight for queries/exemplar documents with relatively few terms. Thus, for short queries, the prior art often discounted the importance of the IDF component during the calculation of TF-IDF scores and the ranking of documents in the corpus.

Some embodiments of the invention also improve the accuracy of TF-IDF scoring systems by processing synonyms or related word forms in a special manner. Specifically, some embodiments analyze the query/exemplar document and group synonyms or related word forms into "word groups". Thereafter, TF-IDF scores are calculated for each individual word group rather than each individual word. By empirical testing, we have determined that such a grouping of words into word groups minimizes the disproportionately high TF-IDF scores given to uncommon words. Prior art systems, by contrast, often give disproportionate weight to an uncommon word present in the search query, regardless of the semantic meaning of the word.

DETAILED DESCRIPTION

Figure 1:
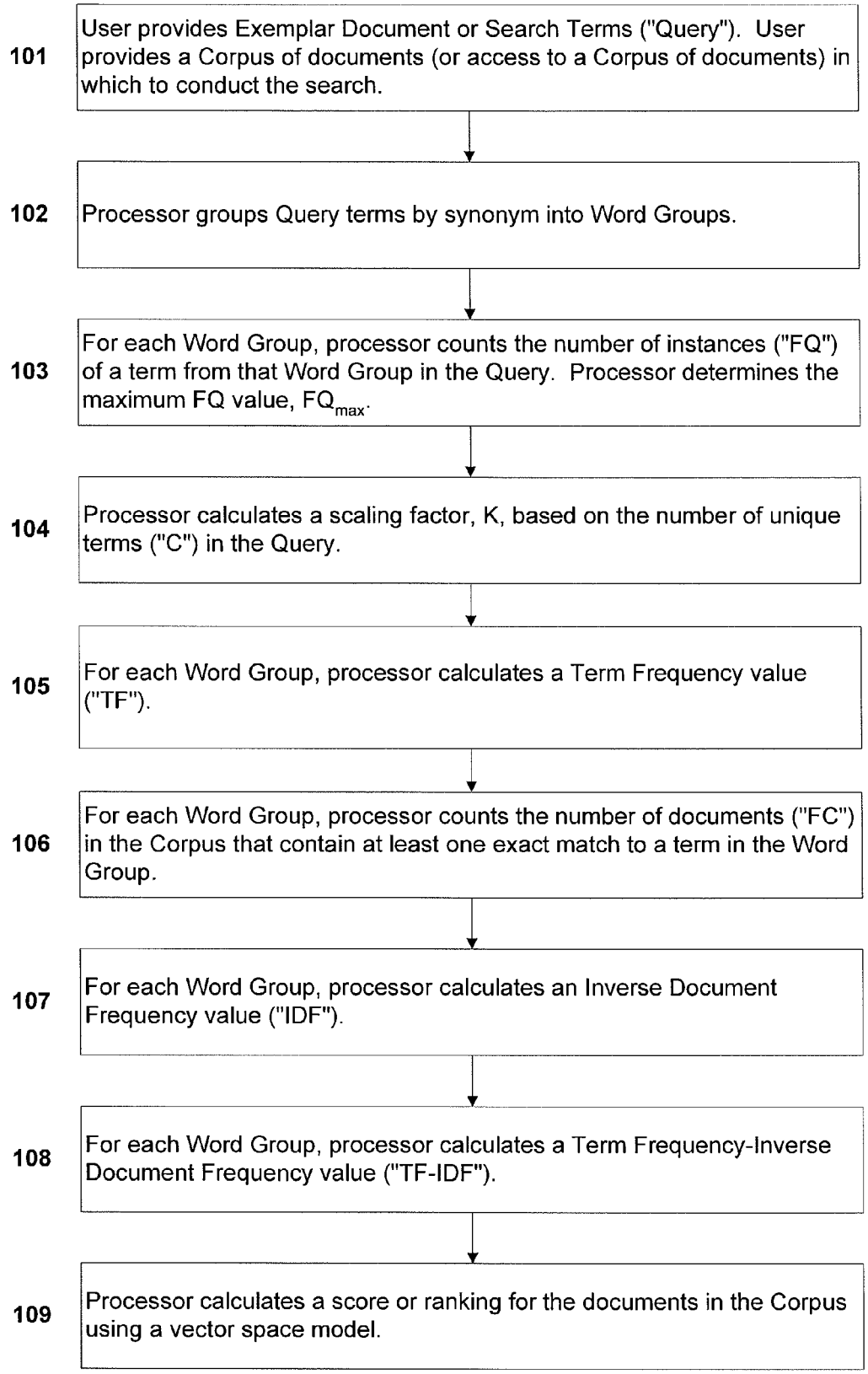
FIG. 1 is a flow chart of the steps taken to calculate TF-IDF scores and rank corpus documents in an embodiment of the invention.

FIG. 1 is a flow chart showing the steps taken to calculate TF-IDF scores and rank documents in the corpus in one embodiment. At step 101, the user provides an exemplar document or search terms ("Query") to the system. An exemplar document is a document which contains text of interest to the user who wishes to locate documents with similar subject matter in the corpus. Alternatively, the user can provide individual search terms to the system.

The user also provides the system with a corpus of documents from which to search. In some embodiments, the corpus of documents is resident in a local or distributed database. A distributed database can be one in which a plurality of discreet individual databases are logically treated as a single database. In other embodiments, the corpus of documents is located on a network, including, but not limited to, the public internet. In providing the system with the corpus of documents, the user can provide the actual documents themselves. Alternatively, the user can provide links to documents or instructions on how the system can search for documents or obtain documents from another source.

At step 102, the processor analyzes the Query and groups the terms of the Query by synonym into Word Groups. The processor utilizes an electronic thesaurus to group the terms. Thus, if the Query contained the words "rabbit" and "hare", these words would get grouped together into a single Word Group if the electronic thesaurus of the embodiment indicated that "rabbit" and "hare" were synonyms.

In addition to synonyms, the thesaurus in some embodiments includes varying word forms such as plurals, participles, verb forms, and any other related word forms. In other embodiments, a separate electronic dictionary is consulted to determine varying word forms before grouping terms together. Thus, if the Query contained the three words "rabbit", "rabbits", and "hare", (a three-word "tuple"), these words would be grouped together into a single Word Group in embodiments of the invention. Similarly, a Query containing "jump", "jumps", and "jumped" would group those three words into a single Word Group. Likewise, a Query containing the words "go" and "went" would group those two words into a single Word Group.

At step 103, the processor analyzes each Word Group to determine the number of instances of a term from that Word Group that is present in the Query. This count of the number of instances in the Query is defined as "FQ" (Frequency in the Query). For example, if the first Word Group in a Query contains the tuple (rabbit, rabbits, hare), then the processor will count the number of times one of those three words appears in the Query. Thus, if the Query contains five instances of the word "rabbit", three instances of the word "rabbits", and one instance of the word "hare", then the FQ value for the Word Group (rabbit, rabbits, hare) would be nine—the sum of five and three and one.

Likewise, if the second Word Group in the Query consists of the tuple (go, went) and the Query contains 30 instances of the word "go" and 40 instance of the word "went", then the FQ value for the second Word Group would be 70—the sum of 30 and 40. After calculating the FQ value for every Word Group in the Query, the processor determines the maximum FQ value ("$FQ_{max}$").

At step 104, the processor calculates a scaling factor, "K", for later use in dampening the "TF component" (Term Frequency component) of the TF-IDF scores. As discussed above, prior art methods for ranking documents based on TF-IDF scores often gave disproportionate weight to Query terms that occurred frequently in the Query but rarely in the corpus. This is especially true when the Query is relatively short and contains a relatively few number of search terms.

The scaling factor "K" in embodiments of the invention is used to dampen the TF component to minimize this disproportionate weight. In general, the TF component is dampened to a greater degree if there are relatively few unique search terms in the Query. Conversely, the TF component is dampened to a lesser extent if there are a relatively large number of unique search terms in the Query. Thus, in embodiments, "K" can be implemented as a generally decreasing function (or a monotonically decreasing function) with a value ranging from one to zero over the domain of positive integers, where the domain represents the number of unique terms in the Query. A relatively high value for K indicates a high level of dampening, with a K of 1.0 indicating that the TF component is dampened 100%. Conversely, a relatively low value for K indicates a low level of dampening, with a K of zero indicating that the TF component is dampened 0%.

A unique term (or unique word) is, as its name implies, a word that appears at least one time in the document. Unlike the grouping of synonyms or word forms into Word Groups in step 102, the counting of unique words in step 104 does not group synonyms or word forms together. Thus, if a Query contains the words "rabbit", "rabbits", and "hare", each of these words is treated as a unique word. Similarly, if a Query contains the word "go" and "went", each of these words is treated as a unique word in step 104. Multiple instances of the same unique word are ignored, however. Thus, if a Query consists solely of the words (rabbit, rabbit, rabbits, hare, go, went, go), then the system and method described herein will register five unique words in the Query: (rabbit, rabbits, hare, go, went).

In one embodiment, the processor counts the number of unique words ("C") in the Query. K is then calculated using the following equation.

$$K=1/SQRT((C+2)/3) \qquad \text{Eq. 1}$$

In other embodiments, K can be calculated in a variety of ways. Generally, K should have a range between one and zero and should generally decrease over the domain of positive integers. In some embodiments, the range of K can be even smaller. For instance, K could range from 0.9 to zero in an embodiment. In another embodiment, K could range for 0.85 to 0.03.

At step 105, the processor calculates a Term Frequency value ("TF value") for each Word Group in the Query. As described above, the TF component of the TF-IDF score represents the prevalence of a term in the Query.

In embodiments of the invention, the TF value for a given Word Group is calculated by dividing the FQ value for that Word Group by $FQ_{max}$ (the maximum FQ value across all the Word Groups). This "intermediate value" (undampened value) for TF is then dampened using the K scaling factor calculated in step 104. In one embodiment, TF for a given Word Group is calculated according to the following formula:

$$TF=K+(1-K)(FQ/FQ_{max}) \qquad \text{Eq. 2}$$

In Eq. 2, both K and $FQ_{max}$ are constant across all Word Groups.

As described above in relation to the scaling factor K, the intermediate TF value ($FQ/FQ_{max}$) will be dampened depending on the value of K. If K is equal to 1.0, then the intermediate TF value will be dampened completely and Eq. 2 will simply leave a TF value of 1.0. As described in more detail below, a TF value of 1.0 indicates a complete disregard of the Term Frequency component of the TF-IDF score. Conversely, if K is equal to 0, then Eq. 2 will simply leave a TF value of ($FQ/FQ_{max}$). Such an undampened TF value is known in the prior art. As described above, however, an undampened TF value produces misleading search results, especially for short queries or queries containing relatively uncommon words.

In other embodiments, the intermediate TF value ($FQ/FQ_{max}$) can be dampened in other ways. In general, the intermediate TF value should be dampened to a relatively higher degree as the number of unique words in the Query decreases. Conversely, the intermediate TF value should be dampened to a relatively less degree as the number of unique words in the Query increases.

At step 106, the processor calculates, for each Word Group, the number of documents in the corpus that contain at least one term that exactly matches a term in the Word Group. This value is designated as the "FC" (Frequency in the Corpus) value. When calculating the FC value for a given Word Group, the processor searches for an exact match in the corpus documents and does not search for synonyms or other word forms that are not already present in the Word Group.

For example, if a given Word Group contains the words (go, went), the system and method only looks for exact matches to "go" or "went" in the corpus documents. The system and method does not consider other synonyms or word forms (e.g., "goes") that were not present in the Query and thus are not present in the Word Group. In this example, then, a corpus document containing only the word form "goes" and not "go" or "went" will not be included in the FC count for the given Word Group.

At step 107, the processor calculates an Inverse Document Frequency value for each Word Group. As described earlier, the Inverse Document Frequency component of the TF-IDF score represents the rarity of a term among documents of the corpus. Thus, Word Groups containing ubiquitous words such as the English articles "the" or "an" will generally have a very low IDF value because such words are likely to be found in a very large percentage of documents in the corpus. Word Groups containing relatively rare words, by contrast, will have a relatively high IDF value because the words are likely in relatively few corpus documents.

In one embodiment, the processor begins the IDF calculation by counting the total number of documents in the corpus, "N". The processor then calculates the IDF value for a particular Word Group using the following formula:

$$IDF=\ln(1+N/FC) \qquad \text{Eq. 3}$$

Summarizing Eq. 3, the total number of documents in the corpus ("N") is divided by the FC value for the given Word Group. This quotient (N/FC) is added to one (1) and the natural logarithm is taken of the resulting sum.

In Eq. 3, the value of N is constant across all Word Groups and FC is the value calculated in step 106 for the given Word Group. In the case of a Word Group with an FC value of zero (indicating no "hits" or matches of a Word Group term in any of the corpus documents), the processor will assign an IDF score of zero to the Word Group rather than perform the calculation of Equation 3.

As described above, the IDF value is a measure of the rarity (inverse frequency) of a Word Group term in the corpus. Thus, if one or more terms of a given Word Group appear in a relatively few number of corpus documents, the IDF value for that Word Group will be relatively high. Conversely, if one or more terms of the Word Group appear in a relatively large number of corpus documents, the IDF value for that Word Group will be relatively low.

In other embodiments, the IDF score is calculated using different functions than Eq. 3. In general, the IDF value will decrease as FC increases.

At step 108, the processor calculates the TF-IDF score for each Word Group. The TF-IDF score, as its name implies, is simply a composite score based on the Term Frequency (TF) component and the Inverse Document Frequency (IDF) component. In embodiments, the TF-IDF score is calculated simply by multiplying the dampened TF component of step 105 by the IDF component of step 107:

$$TF\text{-}IDF = TF * IDF \qquad \text{Eq. 4}$$

The composite TF-IDF score for a given Word Group indicates the importance of the terms in that Word Group for overall searching purposes. As described above, the importance of a Word Group is measured both by the frequency of the terms within the Query and the rarity of the terms among the corpus documents. Terms that appear frequently in the Query are deemed to be terms of particular importance. By contrast, terms that appear frequently in corpus documents are deemed to be terms of lesser importance because they do not distinguish one corpus document from another.

At step 109, the processor utilizes the TF-IDF scores for the Word Groups to rank the corpus documents by relevance. First, the processor orders the TF-IDF scores from highest to lowest, with the highest TF-IDF score indicating the Word Group with the highest relevance. The processor discards any TF-IDF scores of zero. In some embodiments, the processor also discards all Word Groups except the ones with the top "M" TF-IDF scores, where "M" is a user-configurable parameter.

Next, the processor discards all corpus documents which contain no terms from the Query. These documents were identified during the calculation of FC values for the plurality of Word Groups in step 106. That is, only the corpus documents identified during step 106 as containing at least one term from at least one Word Group are retained in step 109; all other corpus documents are discarded.

In embodiments where the processor discards all but the top "M" TF-IDF scores, the processor further discards corpus documents that contain no terms from Word Groups having the top "M" TF-IDF scores.

Finally, the processor ranks all the remaining corpus documents using a vector space model that utilizes cosine similarity for vector comparisons. The processor creates a vector for the Query using the TF-IDF scores and one for each remaining corpus document also using the TF-IDF scores. The processor then ranks the documents using a cosine similarity function to determine the similarity between a given corpus document and the original search Query.

After the corpus documents are ranked, the rankings can be displayed to a searcher who can then review the documents.

Figure 2:
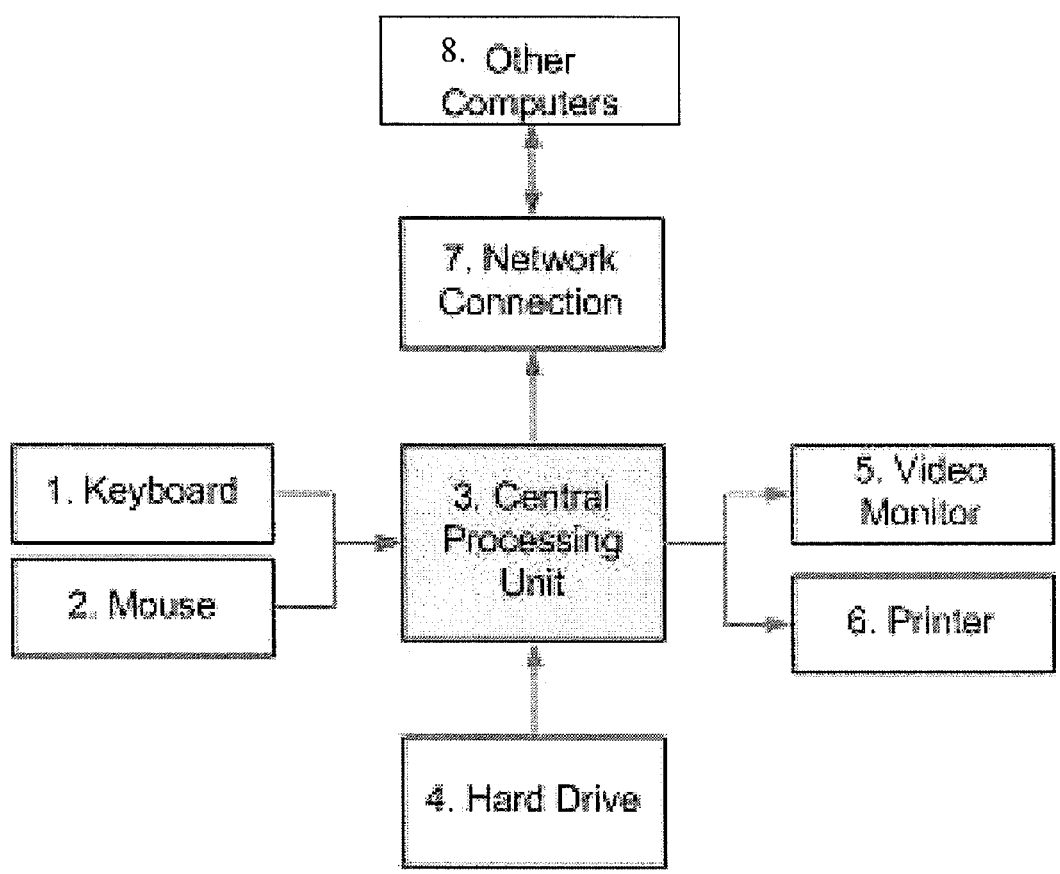
FIG. 2 is a diagram of a system in one embodiment of the invention.

FIG. 2 is a diagram of a system in one embodiment. Central processing unit 3 houses software for performing the method described herein. A user provides input to central processing unit 3 using keyboard 1 or mouse 2. Output from central processing unit 3 is displayed on video monitor 5 or printed out on printer 6. Hard drive 4 houses a database which optionally contains a corpus of documents from which to search. Network connection 7 allows central processing unit 3 to access remote computers or databases 8, which may contain documents comprising the corpus of documents from which to search.

Figure 3:
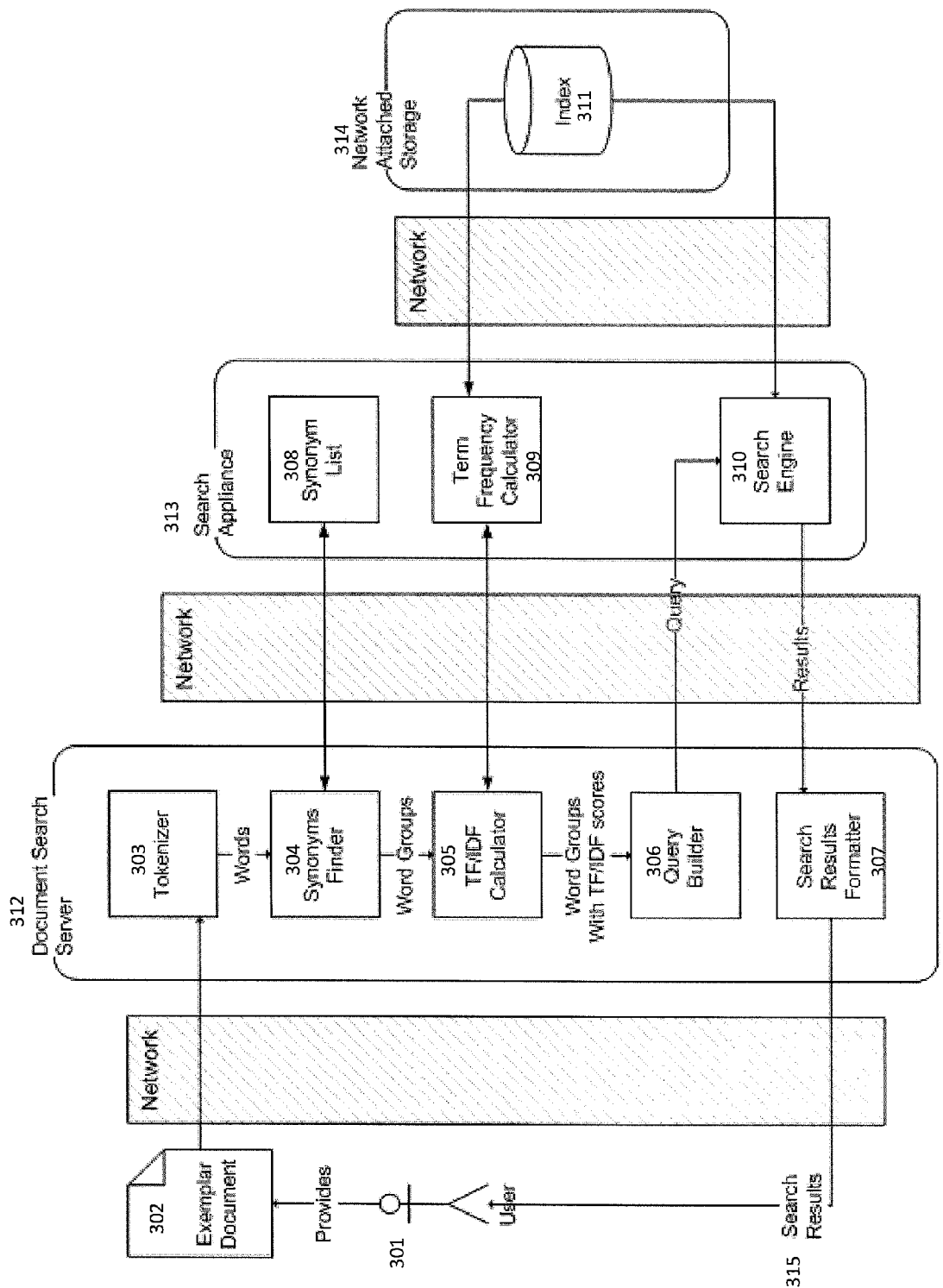
FIG. 3 is a diagram of a system in one embodiment of the invention.

FIG. 3 is a functional diagram of a system in one embodiment. The system is comprised of a Document Search Server 312, a Search Appliance 313, and Network Attached Storage 314.

The system of FIG. 3 could be implemented using the hardware components of FIG. 2. For instance, user 301 could access the Document Search Server 312 using keyboard 1 (FIG. 2) and mouse 2 (FIG. 2). Central processing unit 3 (FIG. 2) could execute programming instructions to carry out the functions of Document Search Server 312, Search Appliance 313, and/or Network Attached Storage 314. Hard Drive 4 (FIG. 2) could provide the Network Attached Storage 314 that comprises database 311.

Document Search Server 312 comprises a Tokenizer 303, Synonym Finder 304, TF-IDF Calculator 305, Query Builder 306, and Search Results Formatter 307. Search Appliance 313 comprises a Synonym List 308, Term Frequency Calculator 309, and Search Engine 310. Network Attached Storage 314 comprises a database 311 for storing an Index and a corpus of documents.

In operation, a user 301 provides an Exemplar Document 302 (or a search query) to the Document Search Server 312. The Tokenizer 303 (word parser) parses the words in the Exemplar Document 302 and outputs the individual words to the Synonym Finder 304. The Synonym Finder 304 looks up synonyms in the Synonym List 308 and groups related words and synonyms into Word Groups, which are sent to the TF-IDF Calculator 305. This parsing of words and grouping of related words and synonyms into Word Groups can be accomplished as described above with regard to step 102 of FIG. 1.

The TF-IDF Calculator 305 accesses the Term Frequency Calculator 309, which in turn accesses the Index in database 311. The Term Frequency Calculator 309 calculates the TF component and the IDF component of each Word Group, accessing the Index as necessary, as described above with regard to steps 103-108 of FIG. 1. Using these calculated components, the TF-IDF Calculator 305 then generates TF-IDF scores for each of the Word Groups. These TF-IDF scores are then sent to the Query Builder 306.

The Query Builder 306 interacts with Search Engine 310, which in turn accesses the Index in database 311. The Search Engine 310 uses the ranked TF-IDF scores to find the relevant documents in the corpus, as described above with regard to step 109 of FIG. 1. These documents are retrieved from database 311 and sent to Search Results Formatter 307. Search Results Formatter 307 will format the search results in a user-readable manner and present the Search Results 315 to the user 301 for his or her review.

Accordingly, while the invention has been described with reference to the structures and processes disclosed, it is not confined to the details set forth, but is intended to cover such modifications or changes as may fall within the scope of the following claims.

What is claimed is:

1. A method for ranking the relevance of each of a plurality of documents in a corpus to a search query of words comprising the steps of:
    a) grouping words in the search query by synonym into one or more word groups, said grouping being performed by a processing unit;
    b) for each word group, counting the number of instances (the "FQ" value) that a word from the word group appears in the search query, said counting being performed by the processing unit;
    c) determining, by the processing unit, the maximum FQ value among all the word groups;
    d) calculating, by the processing unit, a scaling factor K;
    e) for each word group, calculating a term frequency ("TF") value by dividing the FQ value for the word group by the maximum FQ value and applying scaling factor K to the resulting quotient, said calculating being performed by the processing unit;
    f) for each word group, counting the number of documents ("FC") in the corpus that contain at least one word from the word group, said counting being performed by the processing unit;
    g) counting the number of documents ("N") in the corpus, said counting being performed by the processing unit;
    h) for each word group, calculating an inverse document frequency ("IDF") value by dividing N by FC, adding one to the resulting quotient, and taking the natural logarithm of the resulting sum, said calculating being performed by the processing unit;
    i) for each word group, calculating a TF-IDF value by multiplying said TF value by said IDF value, said calculating being performed by the processing unit; and
    j) ranking the relevance of each document in the corpus utilizing the TF-IDF values for the word groups in the search query, said ranking being performed by the processing unit.

2. The method of claim 1 wherein said search query comprises a pre-existing document.

3. The method of claim 1 wherein said search query comprises a string entered by a user in real time.

4. The method of claim 1 wherein said scaling factor K is a monotonically decreasing function over the domain of positive integers whose range does not exceed 1 or fall below 0 where the domain represents the number of unique words ("C") in the search query.

5. The method of claim 1 wherein said scaling factor K is a strictly decreasing function over the domain of positive integers whose range does not exceed 1 or fall below 0 where the domain represents the number of unique words ("C") in the search query.

6. The method of claim 1 wherein step (d) further comprises:
    a) counting, by the processing unit, the number of unique words ("C") in the search query; and
    b) calculating scaling factor K by adding 2 to C, dividing the resulting sum by 3, taking the square root of the resulting quotient, and dividing 1 by the resulting square root, said calculating being performed by the processing unit.

7. The method of claim 4 wherein step (e) further comprises:
    a) for each word group, dividing the FQ value for the word group by the maximum FQ value to calculate an intermediate TF value, said dividing being performed by the processing unit; and
    b) calculating TF by subtracting scaling factor K from 1, multiplying the resulting difference by the intermediate TF value, and adding the resulting product to scaling factor K, said calculating being performed by the processing unit.

8. The method of claim 6 wherein step (e) further comprises:
    a) for each word group, dividing the FQ value for the word group by the maximum FQ value to calculate an intermediate TF value, said dividing being performed by the processing unit; and
    b) calculating TF by subtracting scaling factor K from 1, multiplying the resulting difference by the intermediate TF value, and adding the resulting product to scaling factor K, said calculating being performed by the processing unit.

9. A system for ranking the relevance of each of a plurality of documents in a corpus to a search query comprising:
    a) a processing unit capable of performing calculations;
    b) a storage device on which is stored a corpus of documents;
    c) an input device for receiving the search query;
    d) an output device for displaying the results of the ranking;
    wherein the processing unit groups words in the search query by synonym into one or more word groups;
    wherein the processing unit, for each word group, counts the number of instances (the "FQ" value) that a word from the word group appears in the search query;
    wherein the processing unit determines the maximum FQ value among all the word groups;
    wherein the processing unit calculates a scaling factor K;
    wherein the processing unit, for each word group, calculates a term frequency ("TF") value by dividing the FQ value for the word group by the maximum FQ value and applying scaling factor K to the resulting quotient;
    wherein the processing unit, for each word group, counts the number of documents ("FC") in the corpus that contain at least one word from the word group;
    wherein the processing unit counts the number of documents ("N") in the corpus;
    wherein the processing unit, for each word group, calculates an inverse document frequency ("IDF") value by dividing N by FC, adding one to the resulting quotient, and taking the natural logarithm of the resulting sum;
    wherein the processing unit, for each word group, calculates a TF-IDF value by multiplying said TF value by said IDF value; and
    wherein the processing unit ranks the relevance of each document in the corpus utilizing the TF-IDF values for the word groups in the search query.

10. The system of claim 9 wherein said search query comprises a pre-existing document.

11. The system of claim 9 wherein said search query comprises a string entered by a user in real time.

12. The system of claim 9 wherein said scaling factor K is a monotonically decreasing function over the domain of positive integers whose range does not exceed 1 or fall below 0 where the domain represents the number of unique words ("C") in the search query.

13. The system of claim 9 wherein said scaling factor K is a strictly decreasing function over the domain of positive integers whose range does not exceed 1 or fall below 0 where the domain represents the number of unique words ("C") in the search query.

14. The system of claim 9 wherein the processing unit counts the number of unique words ("C") in the search query and calculates scaling factor K by adding 2 to C, dividing the resulting sum by 3, taking the square root of the resulting quotient, and dividing 1 by the resulting square root.

15. The system of claim 12 wherein the processing unit, for each word group, divides the FQ value for the word group by the maximum FQ value to calculate an intermediate TF value and calculates TF by subtracting scaling factor K from 1, multiplying the resulting difference by the intermediate TF value, and adding the resulting product to scaling factor K.

16. The system of claim 14 wherein the processing unit, for each word group, divides the FQ value for the word group by the maximum FQ value to calculate an intermediate TF value and calculates TF by subtracting scaling factor K from 1, multiplying the resulting difference by the intermediate TF value, and adding the resulting product to scaling factor K.

17. The system of claim 9 further comprising:
a) a document search server;
b) a search appliance; and
c) a database.

18. The system of claim 17 wherein said document search server comprises:
a) a tokenizer;
b) a synonym finder;
c) a TF-IDF calculator;
d) a query builder; and
e) a search results formatter.

19. The system of claim 17 wherein said search appliance comprises:
a) a synonym list;
b) a term frequency calculator; and
c) a search engine.

20. The system of claim 17 wherein said database contains an index of said corpus.

* * * * *